United States Patent [19]
Cantrell

[11] 3,781,049
[45] Dec. 25, 1973

[54] RIGIDLY ATTACHED RESILIENT BUCKLING COLUMN BUMPER SUPPORT SYSTEMS

[75] Inventor: Ronald G. Cantrell, Birmingham, Mich.

[73] Assignee: Houdaille Industries, Inc., Buffalo, N.Y.

[22] Filed: Apr. 12, 1971

[21] Appl. No.: 133,137

[52] U.S. Cl. .................................. 293/99, 293/89
[51] Int. Cl. ........................................... B60r 19/06
[58] Field of Search ............... 293/60, 63, 70, 71 R, 293/83, 85, 86, 89, 96, 99, 101

[56] References Cited
UNITED STATES PATENTS

| | | | |
|---|---|---|---|
| 3,702,202 | 11/1972 | Rumsey | 293/89 |
| 1,691,885 | 11/1928 | Jandus | 293/99 |
| 3,172,268 | 3/1965 | Gensheimer | 61/48 |
| 1,505,556 | 8/1924 | Girl | 293/70 |
| 1,442,493 | 1/1923 | Pearson | 293/70 |
| 1,633,603 | 6/1927 | Otis | 293/101 |
| 1,515,316 | 11/1924 | Snedeker | 293/96 |
| 1,525,379 | 2/1925 | Dunston | 293/99 |
| 2,213,592 | 9/1940 | Reyburn | 293/55 |

FOREIGN PATENTS OR APPLICATIONS

| | | | |
|---|---|---|---|
| 795,775 | 1/1936 | France | 293/70 |

Primary Examiner—Gerald M. Forlenza
Assistant Examiner—Robert Saifer
Attorney—Hill, Sherman, Meroni, Gross & simpson

[57] ABSTRACT

Resilient buckling column bars are rigidly attached to respectively a bumper and a support such as a vehicle frame for impact energy storing during displacement of the bumper relative to the support as permitted by the bars during impact force whereafter the bars return the bumper system to normal position. Ample support is provided by the bars to serve as the connecting structure between the bumper and the support without need for additional jacking bar connection.

6 Claims, 14 Drawing Figures

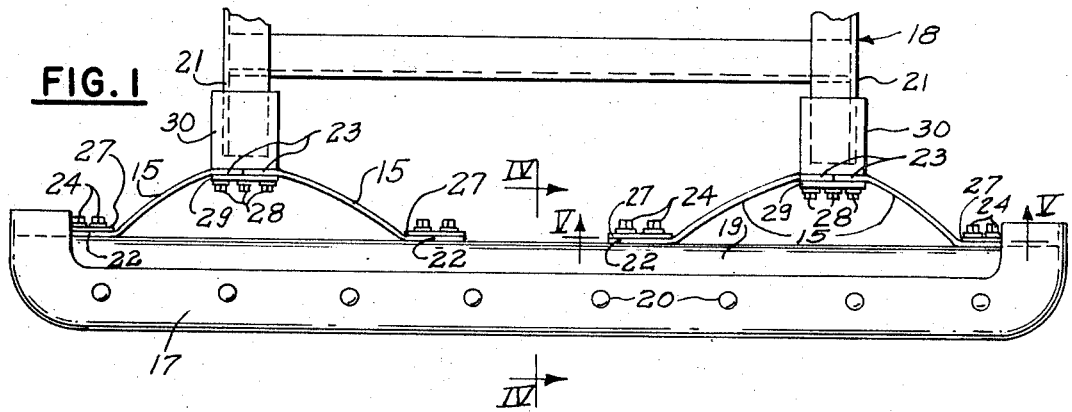
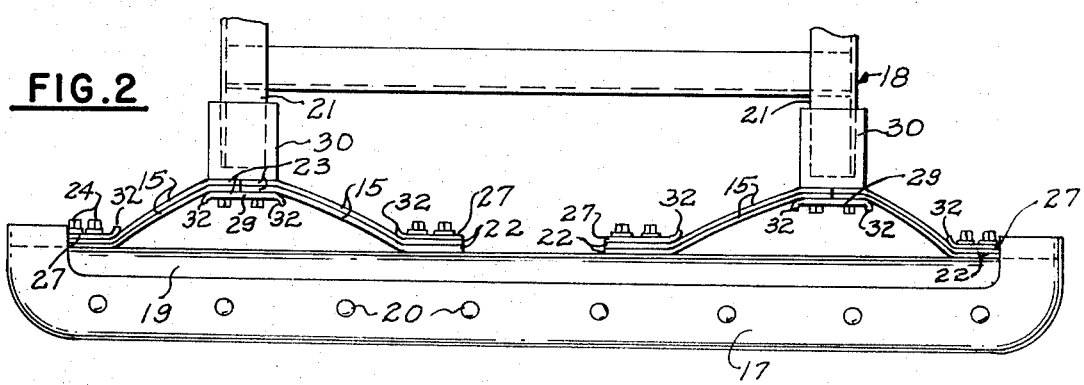
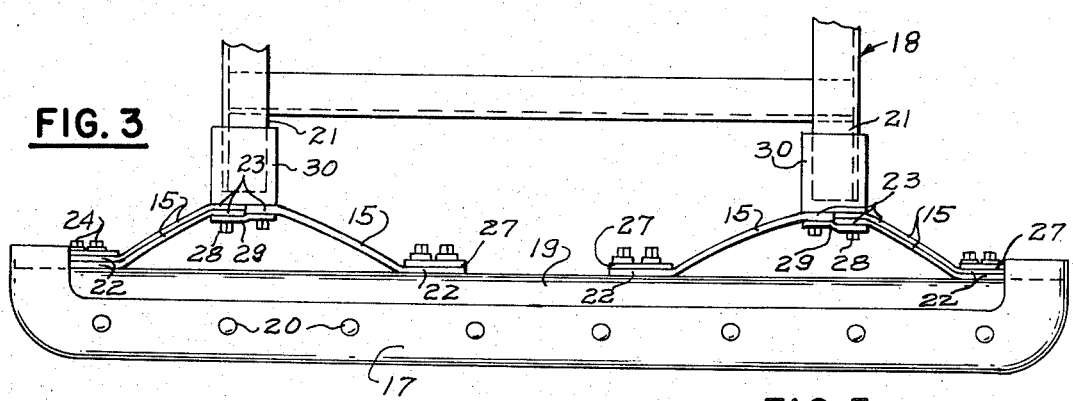
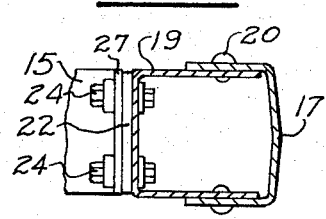
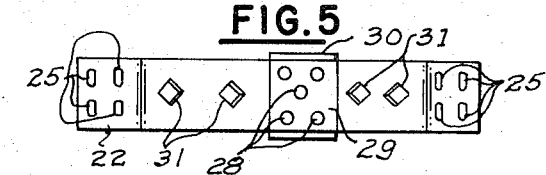
INVENTOR
RONALD G. CANTRELL

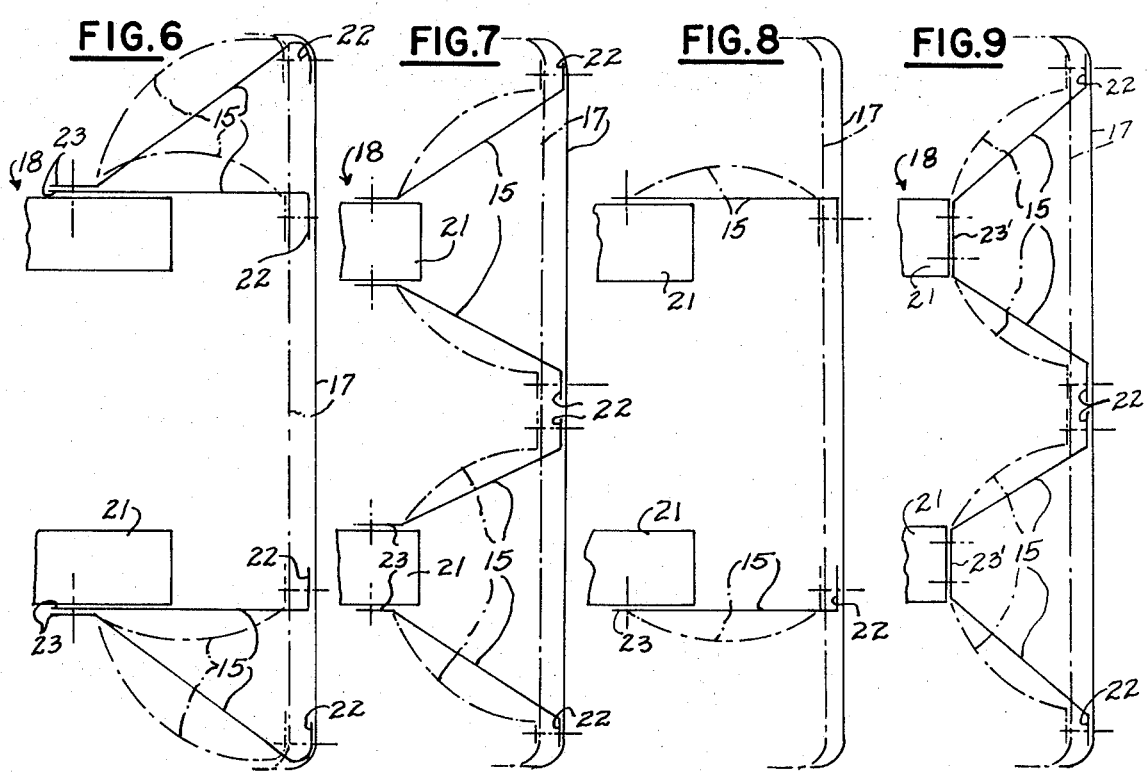
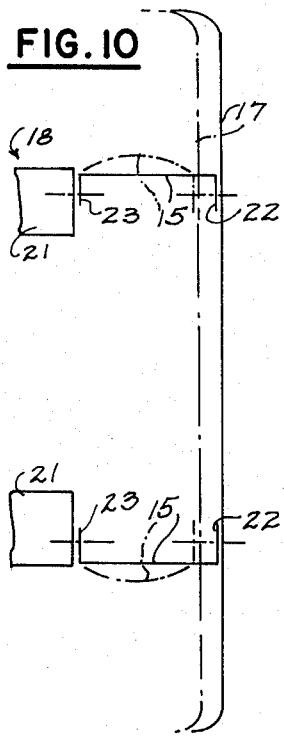
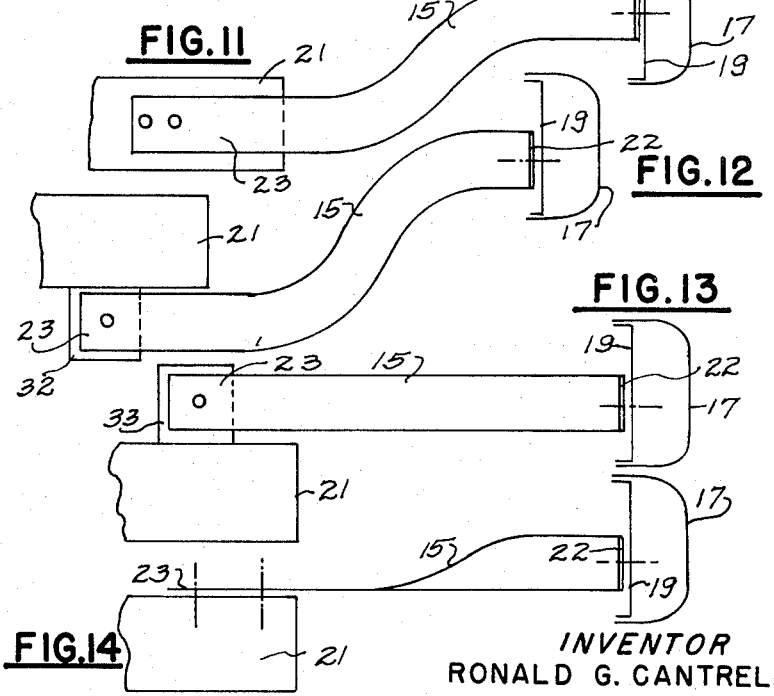

RIGIDLY ATTACHED RESILIENT BUCKLING COLUMN BUMPER SUPPORT SYSTEMS

The invention relates generally to energy storing bumper support systems utilizing resilient buckling column bars, and is more particularly concerned with the mounting of automobile bumpers in a manner to protect the same and the adjacent structure of the vehicle against damage from at least minor collisions to which such bumpers may be subject in the operation of the associated vehicles.

Any moving object develops a certain kinetic energy level proportional to its speed or velocity squared. When the moving object impacts against another moving object or a non-moving object, the kinetic energy must be dissipated and this may occur by deformation of structure or by being stored or absorbed, for example, in a bumper system.

Relating the foregoing specifically to automotive vehicles, and more particularly to automobiles, excessive damage to not only the bumpers but also the adjacent portions of the vehicles has been experienced in respect to present-day bumper designs which have, to a large extent, become mainly decorative trim for the vehicles. Further, it is generally known that in the automobile industry designers are extremely reluctant to sacrifice any styling potentialities, so that there has been a wide drift away from and a virtual impossibility to return to the rugged spring bumpers of an earlier day when the bumpers themselves were generally constructed to absorb rather significant impacts without damage either to the bumpers or to the associated vehicle structure. For reasons of expediency, present-day bumpers are generally constructed of relatively soft steel virtually lacking in spring characteristics and unduly liable to be dented and cracked under rather low impact, and more particularly impacts occuring as low as three miles per hour up to about 10 miles per hour of one vehicle relative to another, where the bumpers are mounted in an essentially fixed or rigid manner relative to the vehicle frame. To alleviate this serious present-day damage situation, with damage claims mounting to exorbitant proportions, various expedients have heretofore been proposed, such as constructing the bumpers of fluid-filled resilient tubes, or equipping them with rubber cushions, but such expedients have been largely resisted due to detraction from designer latitude, cost, unattractive appearance, and the like. Coiled springs or rubber cushions behind the bumpers have been proposed, but these have been unsatisfactory because they introduce an undesirable spring performance characteristic into the system which is representable by a chart curve showing unduly soft resistance at the beginning of impact, thus requiring excessive travel distance or forces to be effective. A further proposal has been to provide collapsibly yieldable structure in the bumper system, but that requires replacement of the system or parts of the system or a physical resetting after impact. Although hydraulic buffers or dampers are highly efficient and may be used in such systems, they are not as versatile as desirable in respect to the direction of impact force, and they add unreasonable cost or original equipment, especially in medium and low priced automobiles, and automobile purchasers resist the expenditure where offered as optional equipment.

Meanwhile, collision insurance rates have necessarily escalated because of the rising volume and size of damage claims, a significant proportion of which result from relatively minor car-to-car collisions where relative vehicle movement is no more than from about 3 to 10 miles per hour, such as in parking lot maneuvering, start-up situations, and congested traffic incidents. This situation has become so serious that not only has there been an indication by the insurance industry of a willingness to reduce collision premium rates by as much as 20 percent on automobiles which can withstand at least a three mile per hour rear end bumper impact and five mile per hour front end bumper impact without damage, and Governmental standards have been or are being implemented to this end.

It is to the attainment of the desirable objective of meeting the problems just outlined and to overcoming the deficiencies, defects, inefficiencies, shortcomings and undesirable factors in prior arrangements and proposals that the present invention is directed.

An important object of the present invention is to provide a new and improved energy storing bumper support system which will meet at least the minimum requirements for absorption of impact or collision forces without damage to bumpers or adjacent portions of the vehicle.

Another object of the invention is to provide a new and improved energy storing bumper support system which can be produced and installed at low cost.

A further object of the invention is to provide a new and improved energy storing bumper support system adapted to be installed without extensive modification of bumper or vehicle structure from current designs and permitting wide latitude in designer's options.

Still another object of the invention is to provide a new and improved energy storing bumper support system embodying the advantages of resilient buckling column bars and avoiding any need for additional jacking support means in the system.

Other objects, features and advantages of the invention will be readily apparent from the following description of certain preferred embodiments thereof, taken in conjunction with the accompanying drawings, although variations and modifications may be effected without departing from the spirit and scope of the novel concepts embodied in the disclosure, and in which:

FIG. 1 is a plan view of a representative bumper system embodying features of the invention;

FIG. 2 is a similar plan view showing a modification;

FIG. 3 is a similar plan view showing another modification;

FIG. 4 is an enlarged fragmentary sectional detail view taken substantially along the line IV—IV of FIG. 1;

FIG. 5 is an elevational view taken substantially along the line V—V of FIG. 1;

FIGS. 6 to 10, inclusive, are schematic plan view representations of various modified arrangements of the resilient buckling column bars in automobile bumpers pursuant to the present invention; and FIGS. 11 to 14, inclusive, are schematic side elevational views of various modified connections of the resilient buckling column bars to the supporting structure or vehicle frame.

An important characteristic of the present invention resides in that resilient buckling column bars 15 (FIG. 1) are rigidly connected in place to and between a bumper 17 and supporting means comprising, for example, an automobile frame 18. It should be understood that the bumper 17 may be of any desired configuration and may be made from any desired suitable material. Although the buckling column bars 15 may be attached directly to the bumper 17, it is generally more expedient to provide the bumper with reinforcing means such as a bar or box beam 19 suitably secured thereto as by means of welding or rivets 20 and providing a load distribution means to which impact anywhere along the bumper 17 is transferred.

In a stable, efficient relationship, the energy storing bumper support system provided by the bars 15 is in a balanced, mutually cooperative relationship between the bumper 17 and the frame 18. To this end, each half of the bumper 17, considered from its longitudinal center is equally supported. In an excellent, practical arrangement, a pair of the bars 15 is provided in supporting relation symmetrically for each half of the length of the bumper. On each half section of the bumper one of the bars 15 is secured to and between an end portion of the beam 19 and an end portion 21 of the vehicle frame, and a second one of the bars 15 is secured between the frame portion 21 and an inner area of the beam 19 near the longitudinal center of the bumper, with the respective pairs of bars 15 disposed in generally splayed relation from the frame to the bumper. The pairs of bars 15 may be constructed in one piece. For maximum resistance to vertical deflection under jacking load the bars have their width vertically oriented.

Means are provided on each of the bars 15 enabling rigid attachment to respectively the bumper and the supporting frame. For this purpose, each of the bars has an outer end attachment terminal flange 22 (FIGS. 1, 4 and 5) and an inner end terminal attachment flange 23. These terminal flanges may extend in any convenient direction, being shown in FIGS. 1, 2 and 3 as in respectively opposite directions angularly relative to the body of the respective bar which extends diagonally between the flanges. Rigid attachment of the flanges 22 to the bumper beam 19 may be effected by means of rivets or bolts 24 the shanks of which extend through suitable bolt holes 25 in the attachment flanges, with the flanges being engaged against the beam 19, and with clamping thrust plates 27 engaging and clamping the flanges in place by action of the bolts. Attachment of the inner terminal flanges 23 to the associated frame portion 21 is by means such as rivets or bolts 28 having the shanks thereof extending through the flanges 23 and thrusting a clamping plate 29 against the end-to-end aligned attachment flanges and securing them rigidly to an anchor block or rigid angle bracket 30 carried by the frame portion 21. Through this arrangement, impact forces tending to thrust the bumper 17 and the frame 18 toward one another are resisted by the resilient buckling column bars 15 which receive endwise compressive forces thereagainst, attaining a high resistance level initially and maintaining that resistance relatively constant throughout the available bumper support system travel stroke, such as on the order of two or three inches.

By suitable structure of the bars 15, they will yield resiliently deflectably within their elastic limits calculated to resist the full range of permissible movement between the bumper and the frame and then when the impact or other pressure is relieved return resiliently to normal position, thereby returning the bumper to its normal position. Desirably the bars 15 are primed or biased as by means of slight initial curvature as shown, to buckle in the desired direction, in this instance inwardly with respect to each of the bars. Each of the buckling column bars 15 is desirably constructed from spring steel material, and may, for example, be formed from SAE 1060 to 1080 steel, heat-treated after formation to attain substantially bainite characteristics with a high degree of toughness, strength and resilience. Typically, the bars may be of about ⅛ inch to 0.2 by 2 to 6 inches cross section, and with the effective body portions of the bars on the order of 7 inches to 36 inches in length.

The bars are positioned in such a manner that their length must shorten by resilient buckling upon impact of the bumper. All force transmission to the bars is through their ends, and not crosswise to the bars. Therefore the bars do not act the same as springs to which the force is applied in the manner of a lever such that the action is relatively soft initially and then gradually builds up to maximum resistance. Contrary to the action of a spring, the buckling column bars resist deflection relatively constantly throughout their range of deflectable resilience.

Important advantages attained by having the ends of the buckling column bars rigidly attached as distinguished, for example, from pivotal attachment reside in that tendency toward looseness or rattling is precluded, attachment is simplified, considerable flexibility as to mounting is possible, and more particularly the bars are thus capable of effeciently sustaining vehicle loads incurred during jacking of the vehicle through the bumper. As shown, no additional jacking bars or supports are required in the buckling column energy storing support system. Greater force resisting capability is also present.

While in some installations such as in the rear end bumpers and possibly also in the front end bumpers of smaller size automobiles, such as the so-called, popular, compacts, each of the bars 15 may be a single bar at each location, it may be desirable in the bumper systems of the heavier, so-called standard size automobiles to provide greater resilient resistance in the buckling column energy storing system. This can be readily accomplished by increasing the number of the bars 15 at each or any selected location, such as shown in FIG. 2 where at each location two of the bars 15 are employed in laminar coextensive relation, thereby substantially doubling the loading capability of the system. If preferred, or the construction is such that a differential impact resistance is desirable between the bumper end locations and the central location, as shown in FIG. 3, a pair of the bars 15 may be placed in laminar relation at each of the end zones or the bumper while the intermediately located bars 15 are singles. Whether in singles or doubles, the bars 15 all cooperate in the system to resist impact deflection anywhere along the length of the bumper, even when the impact force is nearly transverse in relation to the vehicle.

Means are desirably provided for assuring uniform stress loading of the bars 15, and for this purpose suitably placed cutouts 31 (FIG. 5) may be provided in the body portions of the bars such as the generally diamond-shaped cutouts shown spaced apart along the axis of the bar.

To assist in controlling deflectional bending adjacent to the rigidly secured attachment terminal flanges 22 and 23, the clamping plates 27 and 29 may be provided with respective turned, arcuate guide flange end extensions 32 controllably confronting the adjacent end portions of the bar bodies (FIG. 2). This feature also reduces stress at the bolt holes.

Numerous and varied permutations in relative location and disposition of the resilient buckling column energy storing bars are practicable in addition to the general arrangement depicted in FIGS. 1-3 where the splayed pairs of bars 15 are attached to and generally across the outer end of the supporting frame bar or beam. For example, in FIG. 6, the bars 15 have their attachment terminals in overlapped relation and secured to the outer side of the respective supporting frame portion 21, with one of the bars 15 having its body extending diagonally to the adjacent end of the bumper 17 and rigidly secured thereto through the attachment flange terminal 22. The remaining bar 15 of the pair extends longitudinally generally aligned with the end of the associated supporting frame bar 21, and has its terminal flange 22 secured to the bumper spaced from the outer bar 15. In this arrangement, the respective pairs of bars 15 deflect in bowed condition generally outwardly away from the supporting portion 21 in response to impact pressure force as indicated in dot-dash outline.

In FIG. 7, the resilient buckling bars 15 are in splayed pairs with one of the bars in each pair having its attachment terminal flange 23 secured to the outer side of the associated frame support portion 21 while the outer terminal attachment flange 22 of such bar is secured adjacent to the respective end portion of the bumper 17. In this instance the inner of the bars 15 has its terminal attachment flange 23 secured rigidly to the inner side of the frame portion 21 while the attachment flange 22 of such bar is secured to the bumper 17 adjacent to the center, with the attachment flange portions 22 of the innermost of the bars relatively close to one another.

The arrangement in FIG. 8 depicts use of a single one of the buckling column bars 15 in generally longitudinal orientation having its terminal attachment flange portion 23 secured to one side, in this instance the outer side of the supporting frame portion 21, while the outer end terminal attachment flange portion 22 of the bar 15 is secured to the bumper 17 generally in alignment with the supporting frame bar 21.

In the modification of FIG. 9, the resilient buckling column bars 15 are integrally connected together by a common inner terminal attachment flange 23' secured rigidly to the outer end of the respective supporting frame portion 21 and with the body portions of the bars 15 extending in divergent, splayed relation to and having their outer terminal end attachment flanges 22 rigidly secured to the bumper 17.

In FIG. 10, single ones of the resilient buckling column bars 15 are employed between each of the supporting frame portions 21 and the bumper 17, extending generally longitudinally in alignment with the supporting frame portions 21, having their inner attachment terminal flanges 23 rigidly secured to the frame portions 21 and their outer end attachment terminal flange portions 22 rigidly secured to the bumper.

Although in some instances the bumper height and the vehicle frame height and more particularly the height of the vehicle frame end portions 21 may be approximately the same, generally it is desirable to have the bumper at a greater height than the height at which the vehicle frame end portions are customarily located. Accordingly, in order to compensate for differential in elevation of the bumper 17 relative to the frame portions 21, the resilient buckling column bars 15 are adapted to be formed of generally ogee shape in side elevation (FIG. 11) wherein the rear end portions are at substantially lower elevation than the front end portions to accommodate the difference in bumper to supporting frame elevation, while retaining full advantage of the buckling column resilient deflectional resistance to impact. At its front end the attachment terminal 22 of the buckling column bar is rigidly attached to the bumper while at its rear end the buckling column bar may be secured to the side of the frame bar portion 21, similarly as in FIGS. 6, 7 and 8. Of course, the buckling column bars may be attached to the outer end of the portion 21 as shown in FIGS. 1, 9 and 10, if preferred. On the other hand, the terminal attachment portions 23 of the bars 15 may be secured to the underside of the associated frame end portion 21 as shown in FIG. 12, to a suitable rigid anchoring lug or flange 32, the ogee curvature of the bar 15 being such as to maintain the bumper at the desired elevation wherein, as shown, for example, the lower edge of the bumper may be about at the elevation of the upper surface of the frame bar 21.

Where for any reason it is preferred to attach the bars 15 above the frame end portions 21, the arrangement shown in FIG. 13 may be employed wherein the inner attachment terminal portions 23 of the bars are secured to respective upwardly extending lug or flange means 33 on the frame. In this instance it may be feasible to have the bars 15 straight longitudinally.

Under conditions where it is desirable to mount the bars 15 on top of the frame portions 21, but it is not feasible to provide a mounting lug or bracket structure for attachment of the inner terminal portions 23 of the brackets thereto, a direct attachment to the frame portions flatwise may be effected as shown in FIG. 14. In order to attain the most efficient attachment of the bars 15 to the bumper 17, and more particularly to the reinforcing bar or beam 19 thereof, the bars 15 may be formed intermediately generally helically twisted such that while the respective rear end portions thereof are in a horizontal plane, the front end portions thereof are in a vertical plane. While this may sacrifice some of the vertical relative rigidity or resistance to deflection which is a valuable attribute of all of the other forms of the invention disclosed wherein the bars are all disposed with their width in vertical direction for maximum vertical displacement or deflection resistance, at least in the front portion of the bar 15 in FIG. 14 and in the helically twisted portion thereof reasonably good resistance to vertical deflection is attained. This arrangement is especially suitable for use on smaller size compact automobiles in which vertical or jacking loads are small or moderate so that vertical deflection of the bars 15 is not as critical as with heavier vehicles in the jacking process.

It will be understood that variations and modifications may be effected without departing from the spirit and scope of the novel concepts of this invention.

I claim as my invention:

1. In an energy storing bumper system including a bumper and resilient buckling column bars for mounting the bumper on and deflectably relative to a supporting structure, the improvement comprising:

means for attaching inner end portions of the bars fixedly to the supporting structure;

means rigidly attaching outer end portions of the bars to the bumper so that pressure applied against the bumper toward the supporting structure will be stored by resilient buckling of said bars;

said bumper being elongated horizontally; and said bars being arranged in splayed pairs attached in balanced relation along the inner side of said bumper;

aligned flange means on the inner end portions of said pairs of bars for attachment to the supporting structure;

clamping plate means arranged to clamp the flange means against the supporting structure;

said clamping plate means having turned edges opposing body portions of the bars.

2. A system according to claim 1, wherein each of said flange means and said clamping plate means have a plurality of bolt holes spaced apart transversely relative to the bars, with the bolt holes of the plate means matching the bolt holes of the flange means.

3. An energy storing/absorbing system supporting horizontal bumper means on and normally spaced outwardly from relatively rigid structure at the end of an automotive vehicle, comprising:

a plurality of strongly resilient energy storing buckling column metal bars extending in balanced bumper-supporting relation between said vehicle and structure;

means rigidly attaching outer end portions of the bars to the bumper means and inner end portions to the rigid vehicle end structure;

said bars having a wide dimension disposed vertically and a thinner dimension disposed horizontally so that the bars will substantially withstand vertical loads but will enable limited range of inboard displacement of the bumper transmitting endwise compressive forces to the bars accompanied by energy storing/absorbing buckling of the columns in horizontal direction and resilient loading of the bars attaining a high resistance level initially and maintaining that resistance relatively constant throughout said range of displacement, and developing a return bias for the bumper means when released from the force of the impact;

terminal attachment flanges on end portions of the bars to effect said rigid attachment to the bumper means and to the supporting structure of the vehicle, said flanges having vertically spaced bolt holes;

bolts extending through said bolt holes and securing the flanges to respectively the bumper means and the vehicle end support structure; and rigid clamping plates engaging said flanges and secured by said bolts in clamping engagement with the flanges and retaining the flanges against displacement during buckling movements of the buckling column bars;

said plates having turned end portions opposing body portions of the bars adjacent to said flanges to control buckling movements of the bars adjacent to the flanges.

4. An energy storing/absorbing system supporting horizontal bumper means on and normally spaced outwardly from relatively rigid structure at the end of an automotive vehicle, comprising:

a plurality of strongly resilient energy storing buckling column metal bars extending in balanced bumper-supporting relation between said vehicle and structure;

means rigidly attaching outer end portions of the bars to the bumper means and inner end portions to the rigid vehicle end structure;

said bars having a wide dimension disposed vertically and a thinner dimension disposed horizontally so that the bars will substantially withstand vertical loads but will enable limited range of inboard displacement of the bumper transmitting endwise compressive forces to the bars accompanied by energy storing/absorbing buckling of the columns in horizontal direction and resilient loading of the bars attaining a high resistance level initially and maintaining that resistance relatively constant throughout said range of displacement, and developing a return bias for the bumper means when released from the force of the impact;

said buckling column bars being arranged in splayed pairs and having terminal attachment flanges;

bolts comprising said attaching means securing said flanges;

certain of said flanges being disposed in endwise contiguity;

clamping plate means extending onto and between the contiguous flange and secured rigidly thereto by said bolts;

said clamping plate means having turned edges opposing body portions of the bars adjacent to said flanges.

5. An energy storing/absorbing system supporting horizontal bumper means on and normally spaced outwardly from relatively rigid structure at the end of an automotive vehicle, comprising:

a plurality of strongly resilient energy storing buckling column metal bars extending in balanced bumper-supporting relation between said vehicle and structure;

means rigidly attaching outer end portions of the bars to the bumper means and inner end portions to the rigid vehicle end structure;

said bars having a wide dimension disposed vertically and a thinner dimension disposed horizontally so that the bars will substantially withstand vertical loads but will enable limited range of inboard displacement of the bumper transmitting endwise compressive forces to the bars accompanied by energy storing/absorbing buckling of the columns in horizontal direction and resilient loading of the bars attaining a high resistance level initially and maintaining that resistance relatively constant throughout said range of displacement, and developing a return bias for the bumper means when released from the force of the impact;

said means rigidly attaching including attachment flanges on the bars to effect said rigid attachment;

said flanges having a plurality of vertically spaced bolt holes and a plurality of horizontally spaced bolt holes;

securing bolts extending through said bolt holes and securing the flanges rigidly against displacement in all directions but permitting said buckling resilient loading of the bars relative to the bumper means and the vehicle end supporting structure;

rigid clamping plates engaging said flanges and having vertically and horizontally spaced bolt holes matching said flange bolt holes, said plates being secured by said bolts in clamping engagement with the flanges and assisting in retaining the flanges against displacement during buckling movements of the buckling column bars; and said plates having turned end portions opposing body portions of the bars adjacent to said flanges to control buckling movements of the bars adjacent to the flanges.

6. An energy storing/absorbing system supporting horizontal bumper means on and normally spaced outwardly from relatively rigid structure at the end of an automotive vehicle, comprising:

a plurality of strongly resilient energy storing buckling column metal bars extending in balanced bumper-supporting relation between said vehicle and structure;

means rigidly attaching outer end portions of the bars in place to the bumper means and inner end portions to the rigid vehicle end structure;

said bars having a wide dimension disposed vertically and a thinner dimension disposed horizontally so that the bars will substantially withstand vertical loads but will enable limited range of inboard displacement of the bumper transmitting endwise compressive forces to the bars accompanied by energy storing/absorbing buckling of the columns in horizontal direction and resilient loading of the bars attaining a high resistance level initially and maintaining that resistance relatively constant throughout said range of displacement, and developing a return bias for the bumper means when released from the force of the impact;

said buckling column bars being arranged in splayed pairs and said end portions of the bars being terminal attachment flanges;

certain of said flanges extending toward one another in alignment and being disposed in end-to-end abutment;

said attaching means securing said certain flanges in said alignment and abutment;

and clamping plate means extending onto and between said certain flanges and over the abutting ends thereof and secured rigidly thereto by said attaching means; and said clamping plate means have turned edges opposing body portions of the bars adjacent to said flanges.

* * * * *